Feb. 14, 1956  H. D. MARTIN  2,734,757
DEMOUNTABLE CLOSURE
Filed Jan. 21, 1952
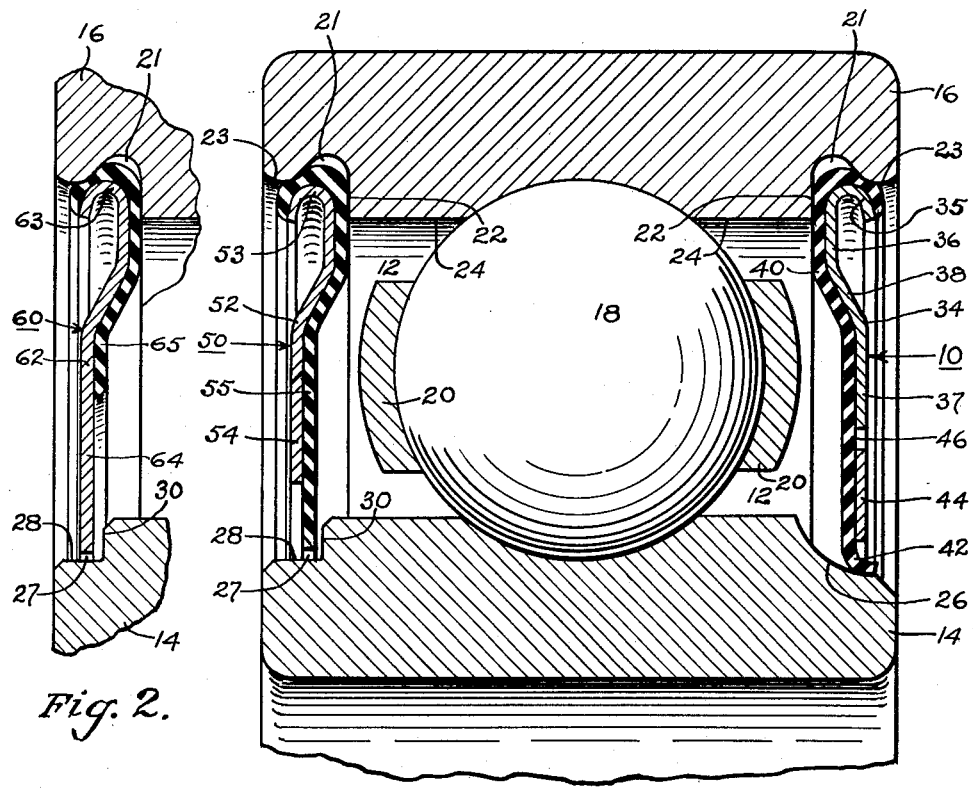
Fig. 2.
Fig. 1.
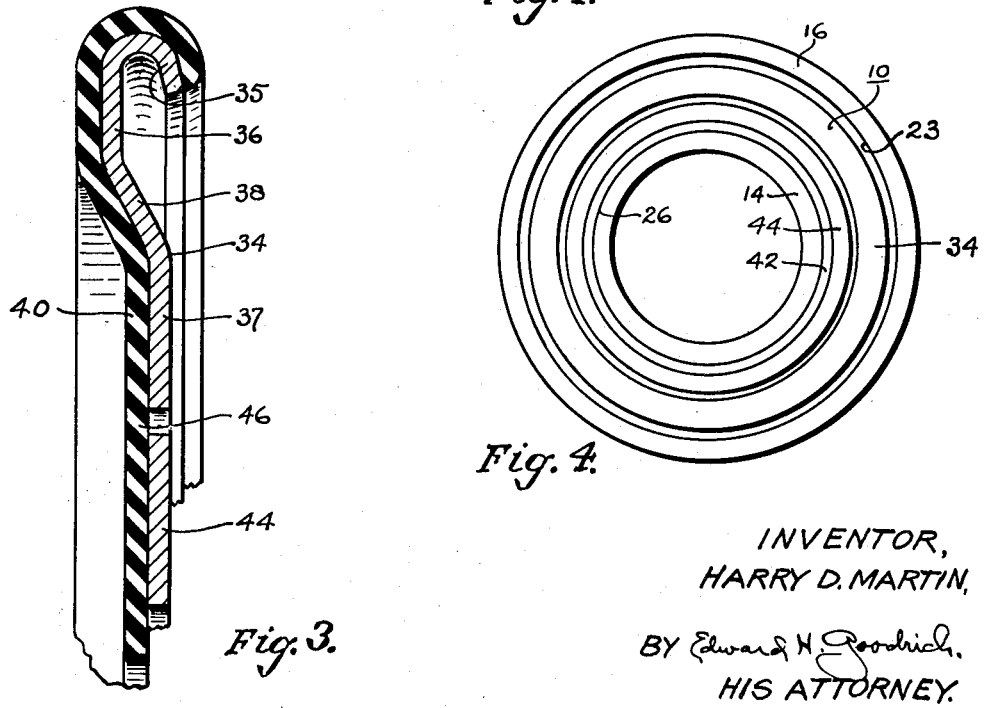
Fig. 3.
Fig. 4.
INVENTOR,
HARRY D. MARTIN,
BY Edward H. Goodrich.
HIS ATTORNEY.

United States Patent Office

2,734,757
Patented Feb. 14, 1956

2,734,757
DEMOUNTABLE CLOSURE

Harry D. Martin, Bristol, Conn., assignor to General Motors Corporation, Detroit, Mich., a corporation of Delaware Application January 21, 1952, Serial No. 267,418

4 Claims. (Cl. 286—5)

This invention relates to a demountable closure for closing the space between a pair of relatively rotatable members and particularly to a demountable closure or seal for keeping lubricant within an antifriction bearing and for preventing dirt and deleterious matter from entering the bearing.

Heretofore, it has been common practice to permanently install seals at the ends of the annular lubricant chamber between the race rings of antifriction bearings by expanding the folded over rim of a metal shield into tightly wedged sealing engagement against the walls of a groove in one of the race rings and to fasten to this shield a sealing washer which is in sealingly wiping engagement with the other race ring. This expanded shield rim not only prevents removal of the seal for cleaning and relubrication of the bearing, but also has been found to often distort the race ring in which it is mounted causing an out of round race ring resulting in damage to the bearing and frequently resulting in an improper fitting seal that lets lubricant leak from the bearing. The operation of a bearing at high temperatures and/or under conditions of overload causes the lubricant to gradually break down and harden resulting in bearing failure. Permanently installed seals prevent the removal and replacement of lubricant in a bearing.

An object of this invention is to provide an improved demountable closure of simple construction that may be easily and repeatedly removed from and replaced in closing relation across a lubricant chamber between a pair of relatively rotatable members without damage to the closure or to the relatively rotatable members.

Another object is to provide for the end of an antifriction bearing an improved closure that may be easily and demountably snapped as a unit into and out of closing relation and without damage across a bearing lubricant chamber while the bearing remains in operative position.

To these ends and also to improve generally upon devices of this character, this invention consists in the various matters hereinafter described and claimed. In its broader aspects, the invention is not necessarily limited to the specific structures selected for illustrative purposes in the accompanying drawings wherein Figure 1 is a cross sectional view through a portion of an antifriction bearing showing two related forms of demountable closures.

Figure 2 is a fragmentary cross sectional view showing another embodiment of my closure demountably positioned in the end of a lubricant chamber.

Figure 3 is an enlarged fragmentary cross sectional view of the closure at the right hand end of Figure 1.

Figure 4 is an end elevation of a bearing with the closure of Figure 3.

A unit-handling demountable closure, as a seal 10, is arranged to be mounted in and removed from closing relation across the end of an annular lubricant chamber 12 between a pair of relatively rotatable members, as antifriction bearing inner and outer race rings 14 and 16 provided with the usual raceways that receive rolling elements, as balls 18 guided by a cage or separator 20. The closure resiliently seats in position and may be repeatedly inserted and removed from operative position without damage to itself or to the bearing, and its yieldable seating relation avoids the danger of bearing distortion occasioned by the use of prior types of closures. Each end of the outer race ring 16 has an annular groove 21 which is transversely curved between an annular shoulder 22 and a transversely rounded annular land 23 having a diameter intermediate that of the bottom of the groove 21 and that of an inner cylindrical surface 24 of the race ring 16. One end, as the right hand end of the inner race ring 14 has an annularly extending transversely curved notch 26, and the other end of this race ring 14 has an annular notch 27 formed by a peripheral surface 28 (herein shown cylindrical) and a generally radially disposed annular shoulder 30.

In the unit-handling closure or seal shown at the right hand end of Figure 1 and in Figure 3, an annular shield 34, which may be stamped out and bent to shape from sheet metal, has a laterally bent-over outwardly rounded rim 35 merging with an outer radial wall 36. A generally radial body portion 37 of this shield is laterally offset from the wall 36 by an intermediate frusto-conical shield portion 38. This laterally offset portion of the shield adds rigidity to the shield and provides more space for lubricant in the lubricant chamber 12. An annular sealing member or washer 40 composed of a sheet of inherently resilient rubber-like material is permanently bonded about the rim 35 and to the inner face of the shield 34 as by cement or by vulcanizing. The sealing washer 40 may be composed of a resiliently deformable material which will not change its resiliency or deteriorate in the presence of heat, light, and bearing lubricants. One suitable material may be composed of a resilient synthetic rubber made from a polymerization product of butadiene and acrylic nitrile. The diameter of the rim 35 and the thickness of the sealing washer 40 is such that the closure assembly may be easily snapped past the annular land 23 into and out of seating relation within the groove 21 due to the resiliently deformable character of the sealing washer. The diameter of the sealing washer about the rim 35 is less than the diameter at the base of the groove 21 so that the sealing washer will not bottom within the groove. When in seated position, the sealing washer 40 sealingly seats against the shoulder 22 and deformably fits against the groove wall forming a side of the land 23 to locate the closure assembly in a predetermined position across the end of the lubricant chamber 12. The resiliently yieldable character of the sealing washer avoids race ring distortion occasioned by previous seals wherein a metal rim was folded over into tightly wedged engagement with the walls of a race ring groove.

When mounted in operative position, the inner periphery of the sealing washer 40 laterally curls over forming a resiliently yieldable annular lip 42 in lightly wiping sealing engagement with the curved wall of the notch 26. The shield 34 preferably extends only part way across the lubricant chamber 12 and a flat reinforcing disc 44, which may be cut out from suitable sheet metal, is bonded as by cementing or by vulcanizing to the outer face of the sealing washer 40 in annularly spaced relation to the inner periphery of the shield 34 and in annularly spaced relation to the sealing lip 42. The space between the shield 34 and the outer periphery of the reinforcing disc 44 provides an exposed annular sealing washer portion 46 that resiliently yields laterally as well as radially to assure effective sealing engagement of the lip 42 against the curved wall of the notch 26, and the resiliency of this annular washer portion 46 coupled with the resilient yieldability of the lip 42 assures a sealing relation of the lip even under conditions of slight race ring misalignment.

In the embodiment shown at the left hand end of Figure 1, a unit-handling closure indicated at 50, has an annular shield 52 formed from suitable sheet material in general conformity to the shield 34 and having a laterally arcuate rim 53 and a radially extending body portion 54. This shield 52 extends across the major portion of the annular lubricant chamber 12 with the annular body portion directed towards but preferably outside of the notch 27. A resiliently deformable sealing washer 55, of synthetic rubber or like material and corresponding to the sealing washer 40, is bonded as by vulcanization or by cementing to the inner face of the shield 52 and radially extends inwardly beyond the shield body 54 into the notch into closely spaced relation with the surface 28 and with the annular shoulder 30. The resilient deformability of the sealing washer portion bonded to the rim 53 permits the closure 50 to be snapped past the land 23 into and out of seated sealing relation against the walls of the groove 21 in the same manner as is done with the seal 10.

In the embodiment of Figure 2, a unit-handling closure 60 has a shield 62 similar to the shield 34 and provided with a laterally rounded rim 63 and an annular body portion 64 extending into the notch 27 in proximity to the surface 28 and into closely spaced relation with the annular shoulder 30. A sealing member or washer 65 formed from a sheet of inherently resilient material, as a suitable synthetic rubber, is bonded as by cementing or vulcanizing to the inner side of the shield and around the rim 63. The sealing washer terminates at its inner periphery in spaced relation to the notch 27 so that it will not interfere with the closely spaced relation of the shield body to the walls of the notch. The resilient yieldability of the sealing washer about the rim 63 permits the closure 60 to be snapped past the land 23 into and out of a predetermined seated sealing relation in the groove 21 in the same manner as the seal 10 is demountably positioned in its groove.

I claim:

1. In a closure for demountable positioning across an annular lubricant chamber between a pair of relatively rotatable members one of which has an annular groove opening towards the other member, said groove being located between a substantially radially disposed shoulder and an annular land, an annular shield extending alongside the lubricant chamber into spaced relation with said other member, a laterally folded-over shield portion providing a transversely arcuate shield rim having a lesser diameter than that of the annular land, a resiliently deformable sealing washer bonded to one side of the shield and bonded to said rim, the diameter of the sealing washer about the rim being intermediate the diameter of the bottom of the groove and the diameter of said annular land, the transverse external width of said washer bonded to said rim being greater than the width of the annular groove between said shoulder and the inner side of said land, and the sealing washer being demountably seated in resiliently deformable wedging engagement with said side of the land and against said shoulder and located in spaced relation to the bottom of said groove.

2. In a closure for demountable positioning across an annular lubricant chamber between a pair of relatively rotatable members one of which has an annular groove opening towards the other member, an annular shield extending a portion of the distance across the lubricant chamber, a laterally arcuate annular shield rim, a sealing washer of inherently resilient sheet material bonded to the rim and bonded to one side of the shield, the sealing washer radially extending beyond the shield into engagement with said other member, a reinforcing disc bonded to the sealing washer in annularly spaced relation to the shield, and the yieldable sealing washer periphery about said rim being of a size to be deformably snapped into and out of seating relation in said annular groove.

3. In a closure for demountably positioning across an annular lubricant chamber between a pair of relatively rotable members one of which has an annular groove opening towards the other member, an annular shield extending partly across the lubricant chamber, a laterally arcuate annular shield rim, a sealing washer of resiliently deformable sheet material bonded about the rim and bonded to one side of the shield, the sealing washer radially extending beyond the shield and having an annular lip in sealing engagement with said other relatively rotatable member, a reinforcing disc bonded at one side to the sealing washer in annularly spaced relation to the shield and in annularly spaced relation to the lip, and the sealing washer about said rim being resiliently and demountably received in said annular groove.

4. In a closure for demountable positioning across an annular lubricant chamber between a pair of relatively rotatable members one of which has an annular groove opening towards the other member, the groove laterally extending between an inner shoulder and an outer transversely rounded annular land, said other member having an annular sealing notch opening towards the groove, an annular shield extending partly across the lubricant chamber, a laterally rounded annular rim on the shield and having a diameter less than that of the annular land, a sealing washer bonded to the rim and bonded to a side of the shield and extending radially inwardly beyond the shield, an annular lip on said washer in sealing engagement with a wall of the notch, a reinforcing disc bonded at one side to the sealing washer and spaced annularly from the lip and annularly from the shield, and the portion of the sealing washer about the rim being deformably and demountably seated in non-bottoming relation within the annular groove and in sealing engagement with said inner shoulder and with said annular land.

References Cited in the file of this patent

UNITED STATES PATENTS

| | | |
|---|---|---|
| 2,067,464 | Smith | Jan. 12, 1937 |
| 2,237,616 | Smith | Apr. 8, 1941 |
| 2,467,049 | Peterson | Apr. 12, 1949 |